J. T. LEWIS.
WINDSHIELD CLEANER.
APPLICATION FILED MAY 17, 1920.
1,382,205.
Patented June 21, 1921.
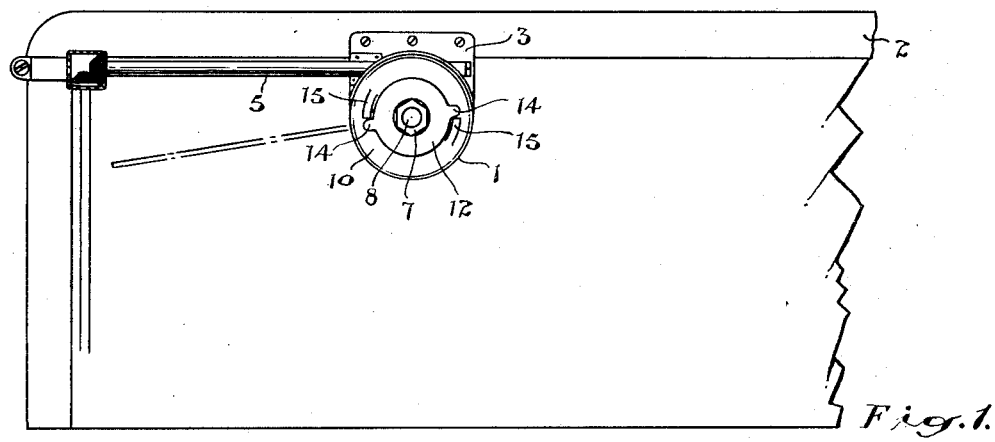
Fig. 1.
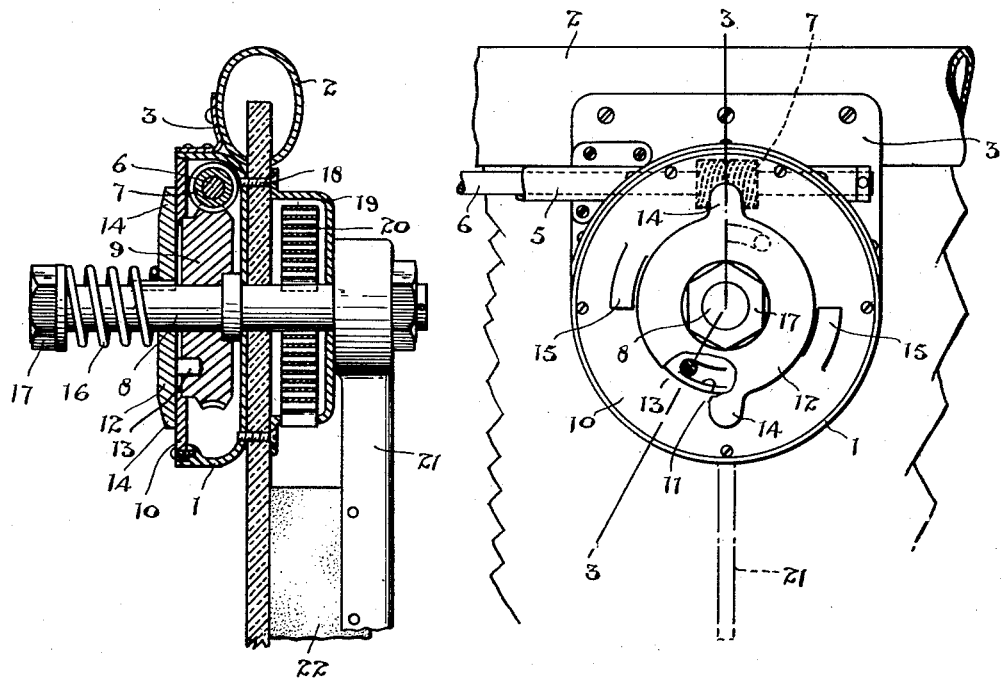
Fig. 3.
Fig. 2.
Inventor.
J. T. Lewis
by
A. J. S. Dennison
atty.

UNITED STATES PATENT OFFICE.

JAMES T. LEWIS, OF TORONTO, ONTARIO, CANADA.

WINDSHIELD-CLEANER.

1,382,205. Specification of Letters Patent. Patented June 21, 1921.

Application filed May 17, 1920. Serial No. 381,884.

*To all whom it may concern:*

Be it known that I, JAMES T. LEWIS, a citizen of the United States of America, and resident of the city of Toronto, county of York, Province of Ontario, in the Dominion of Canada, have invented certain new and useful Improvements in Windshield-Cleaners, described in the following specification and illustrated in the accompanying drawings, that form part of the same.

The principal objects of the invention are, to eliminate the dangers and inconveniences of driving motor vehicles in stormy weather through the accumulation of snow or rain upon the shield and to devise a simple form of cleaner which will operate automatically to maintain the surface of the shield clear.

The principal feature of the invention consists in the novel construction and arrangement of parts, whereby a cleaning member is rotatably supported and operated to swing back and forth over the shield in an oscillating movement.

In the drawings, Figure 1 is an elevational view showing my device attached to a windshield.

Fig. 2 is an enlarged elevational view of the device.

Fig. 3 is a vertical cross sectional view through the line 3—3 of Fig. 2.

The dangers incident to the blurring of the windshield of a motor vehicle by rain or snow are well-known and many forms of manually operated windshield cleaners have been devised and some mechanically operated devices have been proposed.

The present device consists of a circular casing 1 which is adapted to be secured to the upper bar 2 of the frame of the windshield, a fastening bracket 3 being shown secured by screws 4 to said bar.

A tube 5 extends from the periphery of the casing 1 in a substantially tangential direction parallel with the top of the windshield and in this tube is arranged a shaft 6 which extends into the casing 1 and is provided with a worm 7.

A spindle 8 is journaled axially of the casing 1 and upon this spindle is loosely mounted a worm wheel 9 which meshes with the worm 7.

A ring 10 is secured to the outer side of the casing and engages the outward face of the worm wheel holding it in position. The worm wheel is provided with sloping recesses 11 in its outer face within the opening of the ring 10.

A disk 12 is mounted upon the spindle 8 outside of the ring 10 and is slidably keyed to the spindle, said disk having a pair of pins 13 upon the inward side which are adapted to extend into the recesses 11.

A pair of lugs 14 extend radially from the periphery of the disk and these lugs are adapted to engage a pair of sloping cams 15 formed on the outer surface of the ring 10.

A coil spring 16 encircles the spindle 8 at the outer side of the disk 12 and engages a nut 17 on the outer end of the spindle, said spring exerting an inward pressure to hold the disk normally in contact with the ring but allowing it to move outwardly for the release of the pins 13 from engagement with the recesses 11.

The spindle is here shown extending through a hole in the back of the casing 1 and through the windshield glass, though of course the device may be arranged so that the spindle extends through the frame or even over it.

Back of the casing 1 and secured by the screws 18 is a casing 19 in which is housed a helical spring 20 having the inner end secured to the spindle and the outer end secured to the casing. This spring is adapted to be wound up by the turning of the spindle through the operation of the worm. The spindle extends through the casing 19 and on its outer end is secured the cleaner arm 21 which carries a suitable squeegee rubber 22 which operates over the surface of the glass.

The shaft 6 arranged in the tube 5 is here shown (in Fig. 1) driven by means of a pair of beveled pinions, the driving pinion being operated by a suitable vertically arranged shaft which may be a flexible shaft but the flexible shaft may be carried directly to the casing 1.

In the operation of this device the shaft operating the worm is rotated at the will of the operator by being connected with or disconnected from the engine. The rotation of the worm constantly rotates the worm wheel and as the worm wheel rotates, it turns the disk 12 through the pins 13 which project into the recesses 11, the disk being keyed to the spindle rotates the spindle and swings the cleaner arm through the arc of a circle.

The disk 12 is provided with the lugs 14 which engage the cams 15 on the ring 10 as the apparatus is rotated and the said lugs rising on the cams withdraws the pins 13 from engagement with the worm wheel, after the device has been driven through the swing of half of a circle. When the pins are thus withdrawn the spindle is released and the spring 20 which has been wound up by the action of the worm wheel operates to turn the spindle in the opposite direction swinging the cleaner arm back. The worm wheel continues to rotate and as the arm swings back to its original position the pins 13 again drop into the recesses in the worm wheel and the operation is repeated. This back and forth or oscillating movement of the cleaning arm continues as long as may be desired and it keeps a portion of the windshield glass clear of obstructing material.

A device such as described can be readily attached to a windshield and connected to some moving portion of the transmission or it may be operated by hand or by the foot. It is preferable, however to connect it to the constantly rotating mechanism of the motor car and keep it in constant operation in inclement weather, a simple clutch being arranged in the driving mechanism.

What I claim as my invention is:—

1. A windshield cleaner, comprising, a pivotal cleaning arm, mechanical means for swinging said arm on its pivot in one direction, means for disengaging said arm from said operating means, and spring means for moving the arm in the reverse direction.

2. A windshield cleaner, comprising, a pivotal cleaning arm, a spindle secured to said arm, a gear wheel loosely mounted on said spindle, a clutch member mounted on the spindle and engaging said gear wheel, means for disengaging said clutch, and a spiral spring secured to said spindle adapted to rotate it in a reverse direction upon the release of said clutch.

3. A windshield cleaner, comprising, a casing, a spindle axially mounted in said casing, a wiper carried by said spindle, a gear wheel rotatably mounted on said spindle, means for rotating said gear wheel, a clutch member slidably keyed to said spindle, means arranged on said casing for sliding said clutch member to disengage it from said gear, and a helical spring secured to the spindle adapted to rotate it in the opposite direction upon the disengagement of the clutch.

4. A windshield cleaner, comprising, a casing, a spindle axially journaled in the casing, a wiper carried by said spindle, a gear wheel rotatably mounted on the spindle having ratchet notches in its outer face, a clutch disk non-rotatably and slidably mounted on said spindle and having pins adapted to engage the ratchet notches in said gear, spring means for holding said clutch into engagement with the gear, and stationary means arranged on said casing adapted to engage said clutch disk in its rotation and to automatically lift it out of engagement with said gear, and a helical spring adapted to move said spindle in the opposite direction following the release of the clutch.

5. A windshield cleaner, comprising, a casing adapted to be secured to the shield, a spindle axially mounted in said casing, a cleaning arm secured to said spindle, a wormwheel rotatably mounted on said spindle, a worm rotatably mounted in the casing and engaging said worm wheel, a shaft for constantly rotating said worm, a clutch member arranged on said spindle and adapted to engage said worm wheel and to be rotated thereby to swing the cleaning arm, means for automatically releasing said clutch, and a spring for rotating said spindle in a reverse direction.

6. A windshield cleaner, comprising, a casing adapted to be secured to the windshield, a spindle axially mounted in said casing, a wiper carried by said spindle, a wheel rotatably mounted on said spindle within said casing and having ratchet recesses in the face thereof, a clutch member having pins adapted to engage said ratchet recesses and having radially projecting lugs, cam projections arranged on said casing adapted to lift the clutch out of engagement with said wheel, and a coil spring secured to said spindle and adapted to rotate it in the opposite direction on the release of the clutch.

JAMES T. LEWIS.